Aug. 7, 1923.
C. A. GIBBS ET AL
1,464,472
SHUTTER FOR MOTION PICTURE MACHINES
Filed May 23, 1921
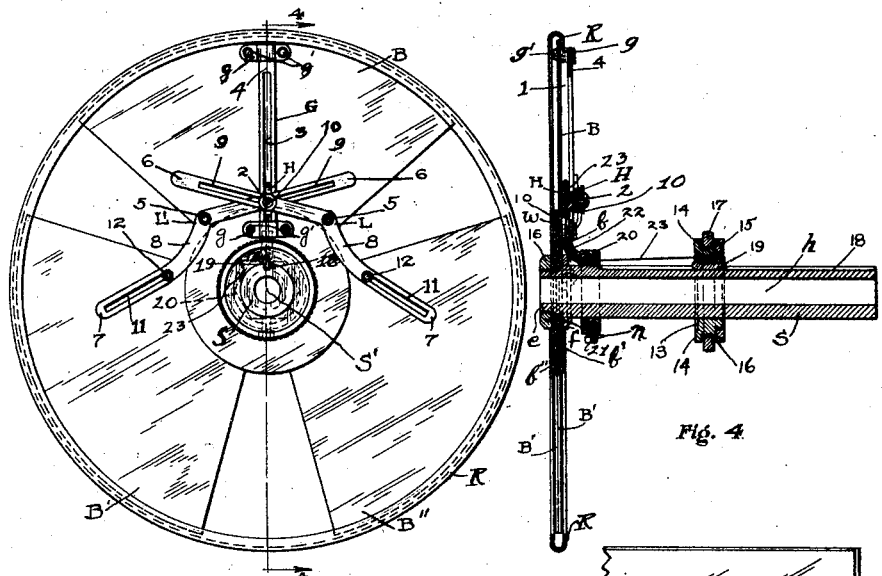
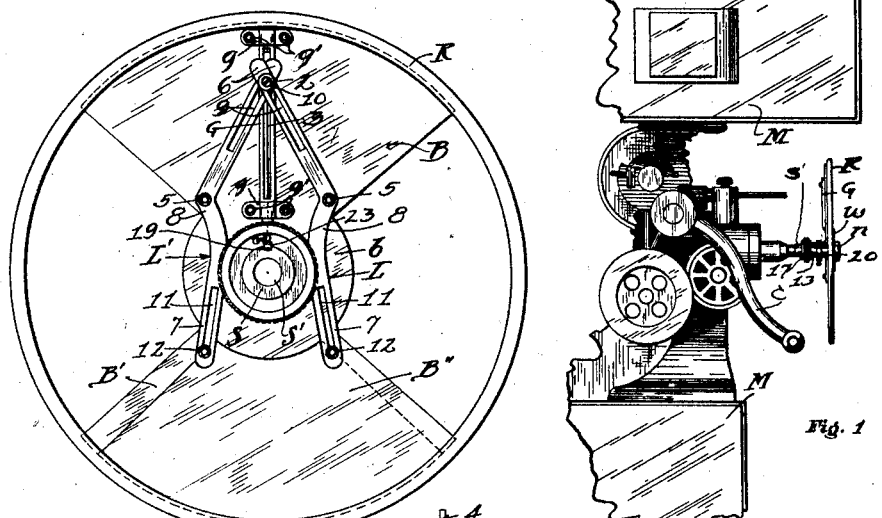
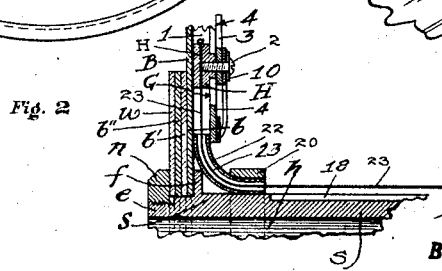
INVENTORS.
Carl A. Gibbs and
Frank A. Sawyer
BY
ATTORNEYS.

Patented Aug. 7, 1923.

1,464,472

UNITED STATES PATENT OFFICE.

CARL A. GIBBS, OF LOS ANGELES, AND FRANK A. SAWYER, OF SANTA MONICA, CALIFORNIA.

SHUTTER FOR MOTION-PICTURE MACHINES.

Application filed May 23, 1921. Serial No. 472,008.

*To all whom it may concern:*

Be it known that we, CARL A. GIBBS and FRANK A. SAWYER, citizens of the United States, and residents of Los Angeles and Santa Monica, respectively, in the county of Los Angeles and State of California, have invented new and useful Improvements in Shutters for Motion-Picture Machines, of which the following is a specification.

This invention relates to and has for an object the provision of an improved form of shutter for application to motion picture projecting machines, of a composite character and adjustable at will, for providing either a duplex or a triplex shutter, whereby the flicker in the picture may be eliminated by the substitution of one type of shutter for another, depending upon the speed of the machine.

In the use of motion picture projecting machines the shutter is an essential feature and is usually mounted in front of the lens on an extended shaft and is provided with either two or three segmental blades, with openings therebetween, so as to provide regularly spaced intervals of light during the operation of the machine. It will be understood by those skilled in the art that the film of a moving picture machine is intermittently moved behind the objective and is brought to rest in a position for projection and remains stationary for a moment, so that each successive picture may be projected from the machine during the intervals between the projection of the different pictures. The film is actuated so as to move one picture from its projecting position, and the succeeding picture into projection position. During the interval that the film is moved, it is essential that the light be cut-off from the curtain and the shutter which is a well-known device, serves this purpose.

To this end only one segment is necessary to cut off the light, but usually two or three segments of similar character are used in a shutter, so that the flicker of the picture will be eliminated by making the light and dark intervals of the picture substantially uniform.

The character of shutter required for use in a motion picture machine is determined according to the speed of the machine. A duplex or double bladed shutter is usually employed when the machine is operating at high speed, and a triplex shutter when the machine is operating at low speed. The object of the shutter, as is well-known, in addition to cutting off the light at regular intervals, as hereinbefore stated, is to reduce the flicker or movement of the picture on the screen. Inasmuch as only one picture is shown for each intermittent movement of the film, it will be obvious that only one blade in a shutter is necessary to cut-off the light during the intervals in which the film is moved. When a duplex shutter is used the additional blade is spaced uniformly with respect to the cut-off blade, and while serving to cut off the light, as does the cut-off blade, it will be understood that this additional blade also reduces the flicker which would ordinarily be caused by the light interval being substantially larger than the dark interval of the picture. When the machine is operating at high speed with a duplex shutter, the two blades are sufficient to reduce the flicker to a minimum, because of the fact that the periods of exposure are short and rapidly succeed each other, due to the high speed of the machine.

When the machine is operating at low speed, however, the periods of exposure are correspondingly longer, and a duplex shutter if used would not serve the purpose of eliminating or reducing the flicker, as would a shutter having three blades, therefore when the machine is operated at a low speed, it is desirable to employ a three bladed shutter, so as to reduce the periods of exposure and correspondingly reduce the flicker to a minimum.

It is inconvenient during the operation of a machine to substitute one type of shutter for another, for the reason that frequently the speed of the machine is changed during the projection of a single picture, so as to either slow down or step up the action of the picture, therefore it is a primary object of our invention to combine both forms of shutter in a single unit and adapted to be mounted on the machine in readiness for use, and capable of manual adjustment at will, for conforming to the requirements of the picture, and obtaining the best results.

To this end our invention embodies a single unitary structure having three segmental blades, two of which are adjustable, and one stationary with respect to a common mounting. When a duplex or double bladed shutter is necessary the two adjustable blades may be actuated manually and moved into a common plane with one of the blades slightly overlapping the other, so as to form the equivalent of the usual type of duplex shutter, wherein both of the blades are of uniform size and spaced uniformly apart.

Where it is desired to employ a triplex or three bladed shutter in a machine, the two movable blades may be adjusted so as to provide three blades of uniform size and uniformly spaced apart, so as to take the place of the usual triplex shutter.

We have provided in our machine a novel, efficient and practical means of actuating the shutter, the details of which we will hereinafter describe. Other objects may appear as the description progresses.

We accomplish the objects herein set forth by means of the details of structure and arrangement of parts shown in the drawings, and constituting one practical embodiment of our invention, subject to modification within the scope of the appended claims without departing from the spirit of our invention.

In said drawings:

Fig. 1 is a fragmentary side elevation of a motion picture projecting machine with our improved shutter mounted thereon for use.

Fig. 2 is a face view of our mechanism adjusted for providing a duplex shutter.

Fig. 3 is a face view of the same, adjusted for providing a triplex shutter.

Fig. 4 is a sectional elevation on line 4—4 of Fig. 2; and Fig. 5 is an enlarged sectional elevation on the same plane as Fig. 4.

The preferred form of mechanism shown in the drawings includes a stationary cut-out blade B, and relatively adjustable blades B′ and B″, of segmental form and having circular inner portions $b$, $b'$ and $b''$, respectively, which are pierced concentrically, so as to receive the threaded end $e$ of a hollow stem S. Said stem has a flange $f$ adjacent the portion $b$ of the stationary shutter B, and the outer end E is provided with a nut $n$, which is adapted to be threaded thereon, against a washer W adjacent the outer side of the inner portion of the movable blade B″. The stem S is provided with a bore $h$, which is adapted to fit the shutter shaft S′ of the projecting machine M, said shaft being extended forwardly of the machine in front of the film actuating mechanism A and the operating crank C, as shown in Fig. 1.

The stationary cut-off blade B has a radially extending guide G held thereon in a pair of spaced clamps $g$, $g$, which are attached to the blade B by means of screws $g'$, $g'$; and the guide G thereon is so positioned on the blade B that the open side of the channel 1 thereof is closed by the blade. A cross head H, corresponding in size to the channel 1 of the guide is slidably held therein and has a screw 2 attached thereto and extending outwardly through an elongated slot 3, formed in the outer web 4 of the guide. A pair of levers L and L′ of uniform size and character are pivoted midway of their ends by means of screws 5, 5, to the blade B and have upwardly inclined portions 6, 6, downwardly inclined portions 7, 7, and intermediate curved portions 8, 8.

The portions 6, 6, of said levers have elongated slots 9, 9 formed therein which are adapted to receive the cross head screw 2, and a washer 10 is held on the outer end of said screw, in contact with the outermost of said levers. The lower ends of said levers have elongated slots 11, 11, which slidably receive screws 12, 12 attached to the movable blades B′ and B″.

It will be noted that the cross head H is substantially elongated so as to prevent the binding thereof when it is moved longitudinally of the guide G, and when the parts are in the position shown in Fig. 2, the screws 12, 12 will engage the lower ends of the slots 11, 11, of the levers L and L′ and the cross head H will be positioned near the outer end of the guide G, while the screw 2 thereon will engage the outer ends of the slots 9, 9, in said levers. Also, when in this position the adjustable blades B′ and B″ will be positioned in overlapping planes and will have an area of substantially equal extent with the cut-out blade B, thus providing spaces between the blades of uniform size. When the blades B′ and B″ are adjusted to the position shown in Fig. 3, the triplex shutter having three blades of uniform size with uniform spaces therebetween will be provided.

As shown in the drawings, the adjustment of the blades may be readily accomplished by means of a slidable collar 13 mounted on the stem S of the mechanism, and having an integral flange 14 on the outer side thereof, and a movable flange 15 on the opposite side thereof, and adapted to be threaded thereon, so as to provide an annular groove 16 on the face of the collar. A floating ring 17 is loosely positioned in the groove 16 and held on the collar between the flanges 14 and 15, and said ring may be knurled on the sides and periphery, so that it may be readily grasped and held stationary by the hand of the operator. The collar 13 is adapted to rotate with the stem S and to that end a key-way 18 is provided in the stem S for receiving a key 19 attached to the collar 13, or if more desirable the key may be stationarily held in the key-way 18 and a corresponding key-way cut into the collar 13, so as to permit the collar to slide over the key. Near the flange f of the stem we provide a collar 20 which is held stationarily on the collar by means of a key, or by means of a set screw 21, and said collar is connected with the lower end of the guide G by means of a curved tube 22 which is attached at its opposite ends to the collar 20, and to the guide G. The cross head H is operably connected with the collar 13 by means of a stiff wire 23 which is connected at one end to the collar 13 and at the other end to the cross head H.

Thus, as the collar is moved forwardly or backwardly on the stem S, the cross head H will be correspondingly moved downwardly or upwardly, as the case may be, in the channel 1 of the guide G, and the levers L and L' which are connected with the cross head will be swung on their pivoted screws 5, 5, so as to move the blades B' and B'' into either of the positions shown in Figs. 2 and 3.

The outer edges of the shutter blades B, B', and B'' are reinforced by means of an annular channeled ring R which may be suitably attached to the stationary blade B and loosely connected with the movable blades B' and B'' so that the edges of the movable blades may slidably engage the same.

It will be apparent that we have provided a thoroughly practical and convenient shutter mechanism for motion picture projecting machines, which may be readily actuated without stopping the machine, by the operator, at will, for reducing the flicker in the picture to a minimum.

Other benefits of our improvements will readily occur to those skilled in the art.

What we claim is:

1. A shutter for motion picture machines including a stationary blade and a pair of blades pivotally movable relative thereto, a shaft for supporting said blades in operative position, a pair of arms pivotally held on said fixed blade and having end portions connected with said movable blades, and opposite end portions overlapping and connected together, and means slidably mounted on said shaft and connected with the overlapping ends of said arms for adjusting the movable blades relative to the fixed blade.

2. A shutter for motion picture machines including a shaft, a fixed segmental blade thereon, a circular rim attached to said blade and concentric with said shaft, a pair of movable segmental blades pivotally held on said shaft and having their outer peripheries slidably held in said rim, a radially disposed guide member on said fixed blade, arms pivotally attached to opposite portions of said fixed blade and adjustably connected to opposite portions of said movable blades and having opposite portions thereof overlapping and overlying said guide member, a longitudinally adjustable collar on said shaft commonly connected with the overlapping portions of said arms, whereby the movement of said collar will effect the adjustment of said movable blades.

3. A shutter for motion picture machines including a circular rim, a shaft concentric therewith, a fixed blade connecting said shaft and said rim, a movable blade pivoted on said shaft and slidable in said rim, a radially disposed guide member having a longitudinal slot therein, a bolt movably held in said slot, an arm pivoted midway of its ends to the inner portion of said fixed blade and having its opposite end portions slotted longitudinally, a pin in said movable blade engaging one of said slots, the other of said slots engaging the bolt in said guide member whereby when said bolt is moved longitudinally of the guide member, the movable blade will be correspondingly moved in a circular path relative to the fixed blade.

4. A shutter for motion picture machines including a circular rim, a shaft concentric therewith, a fixed blade connecting said shaft and said rim, a movable blade pivoted on said shaft and slidable in said rim, a radially disposed guide member having a longitudinal slot therein, a bolt movably held in said slot, an arm pivoted midway of its ends to the inner portion of said fixed blade and having its opposite end portions slotted longitudinally, a pin in said movable blade engaging one of said slots, the other of said slots engaging the bolt in said guide member whereby when said bolt is moved longitudinally of the guide member the movable blade will be correspondingly moved in a circular path relative to the fixed blade, and a collar slidably held on said shaft and connected with and for moving said bolt.

5. A shutter for motion picture machines including a circular rim, a shaft concentric therewith, a fixed blade connecting said shaft and said rim, a movable blade pivoted on said shaft and slidable in said rim, a radially disposed guide member having a longitudinal slot therein, a bolt movably held in said slot, an arm pivoted midway of its ends to the inner portion of said fixed blade and having its opposite end portions slotted longitudinally, a pin in said movable blade engaging one of said slots, the other of said slots engaging the bolt in said guide member whereby when said bolt is moved longitudinally of the guide member the movable blade will be correspondingly moved in a circular path relative to the fixed blade, and a collar slidably held on said shaft and connected with and for moving said bolt, the connection between said collar and said bolt including a flexible wire, as described.

CARL A. GIBBS.
FRANK A. SAWYER.

Witnesses:
J. W. SHEELEY,
LUTHER L. MACK.